Sept. 17, 1957 — G. A. LYON — 2,806,742
WHEEL COVER
Filed July 12, 1952
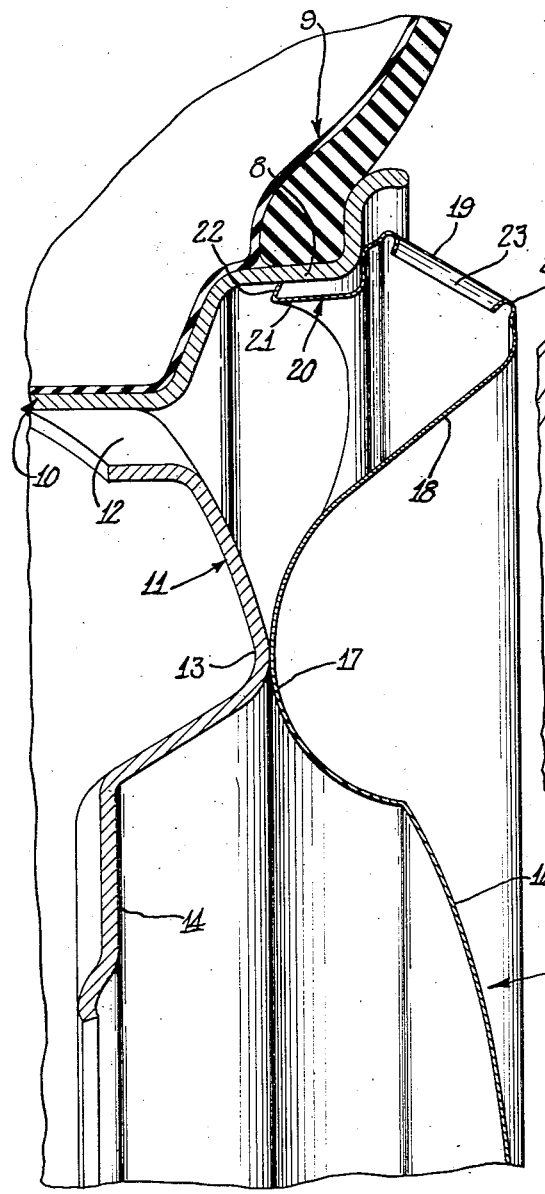
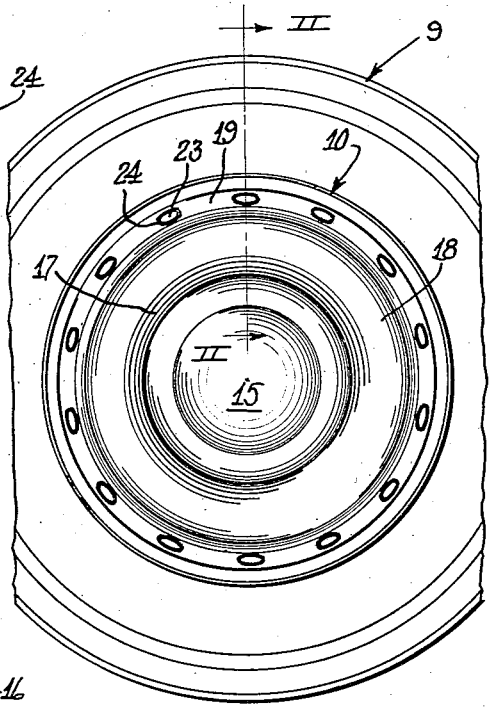
Inventor
George Albert Lyon United States Patent Office 2,806,742
Patented Sept. 17, 1957

2,806,742

WHEEL COVER

George Albert Lyon, Detroit, Mich.

Application July 12, 1952, Serial No. 298,491

3 Claims. (Cl. 301—6)

This invention relates to automobile wheel covers and more particularly to a cover with a novelly bulged and apertured portion beyond the wheel for assisting in the circulation of air through the cover in the rotation of the wheel.

An object of this invention is to provide an improved wheel cover with air-circulating means and which lends itself to economical manufacture on a large production scale.

In accordance with the general features of this invention, there is provided in a cover structure for a wheel including flanged tire rim and body parts, a circular wheel cover having an outwardly bulged slanting portion projecting substantially beyond the wheel and being inclined radially axially toward the wheel rim part and apertured for the circulation of air therethrough in the rotation of the wheel.

Another feature of the invention relates to locating each of the aperturees in a raised annulus formed on the axially outwardly bulged and inclined portion of the cover.

Other objects and features of this invention will more fully appear from the following detailed description taken in connection with the accompanying drawings which illustrate a single embodiment thereof and in which:

Figure 1 is a fragmentary side view of a wheel having my novel cover applied thereto; and Figure 2 is an enlarged fragmentary cross-sectional view taken on substantially the line II—II of Figure 1 looking in the direction indicated by the arrows.

As shown on the drawings:

My novel cover, which is designated generally by the reference character 15, is adapted for use with a conventional automobile wheel. Such a wheel includes the usual pneumatic tire and tube assembly 9 carried in the customary way upon the flanges of a multi-flanged drop-center type of tire rim 10. In turn, the rim 10 is supported and carried by a bulged metallic body 11 which has spaced wheel openings 12 alternating with the points of attachment of the rim to the body part as is well known in the art.

The central portion of the body part 11 is bulged outwardly into a nose 13 and is depressed axially rearwardly into a central bolt-on flange 14. This flange is adapted to be detachably secured by any suitable means such, for illustration, as bolts or cap screws (not shown) to a part on the axle of the wheel.

The cover 15, which is provided in accordance with the features of this invention, is constructed to conceal the unsightly irregularities in the exterior surfaces of the rim and body parts 10 and 11 and particularly the junction of these parts which usually constitutes an eye sore due to the accumulation of dirt and corrosive materials at the junction.

The cover 15 is of such construction that it may be economically manufactured on a large production scale as a metallic stamping which may be made from any suitable metallic sheet such as steel strip, although excellent results are attainable by making it from thin stainless steel stock.

Referring to Figure 2, it will be perceived that the cover 15 includes a central crown portion 16, an annular intermediate dished or depressed portion 17 for bottoming on the wheel nose portion 13, and an outwardly turned portion 18 extending beyond the wheel. This outwardly turned portion 18 leads into the outer periphery of the circular cover which is in the form of an inclined or slanting bulged portion 19. This slanting portion 19 extends axially and radially toward the terminal flange of the tire rim part 10.

Rearwardly of the cover, the inclined portion 19 is formed into an underturned cover retaining annular flange designated generally by the reference character 20. This retaining flange is broadly claimed in my copending patent application, Serial No. 223,416, now Patent No. 2,624,634, of which the present subject matter is a continuation in part.

It suffices to say that this flange 20 is cut out at spaced intervals to provide a series of eight or more axial finger portions 21, each of which terminates in a relatively short stiff terminal leg 22 at an acute angle to the leg 21. Actually, the short leg 22 extends radially and axially outwardly for turned gripping engagement with a surface of the rim flange 8.

By using a steel possessing some resiliency, such as stainless steel, the terminal legs or fingers 22 can have tensioned gripping engagement with the rim flange 8 as such terminal legs are cammed into engagement with the flange in the application of the cover to the wheel.

Now the present invention is particularly concerned with the slanting or inclined bulged portion 19 which has a series of air openings or apertures 23 and each of which is defined by a raised annular lip 24 depressed from the slanting portion 19 and which ornaments the cover.

By reason of the fact that the slanting portion 19 for the most part is beyond and outwardly of the rim part 10, the openings 23 are so located that in the rotation of the wheel they will assist in circulation of air through the cover. Needless to say, such augmented circulation of air through the cover can be utilized if it is so desired to assist in cooling the wheel.

As will be noted from Figure 2, the bulged portion is of considerable size or mass and by reason of its angular construction serves as a rigidifying backing for and relative to which the finger portions 21 can resiliently flex in the application and removal of the cover 15. Thus, the slanting or angular construction of the bulged portion 21 effectively strengthens the cover at the points of weakness occasioned by the air openings 23.

I claim as my invention:

1. In a cover structure for a wheel including flanged tire rim and body parts, a circular wheel cover having an outwardly dished and radially outwardly slanting annular portion projecting axially substantially beyond the wheel and an integral radially outer apertured portion continuous with said annular portion but oppositely inclined toward and bottoming on said wheel rim part, said slanting and apertured portions diverging from a common junction comprising an annular outermost bulge in the cover and said slanting portion having its inner surface confronting the apertures in said apertured portion and over which air passing through said apertures passes.

2. In a cover structure for a wheel including flanged tire rim and body parts, a circular wheel cover having an outwardly dished and radially outwardly slanting annular portion projecting axially substantially beyond the wheel and an integral radially outer divergent apertured portion continuous with said annular portion but oppositely inclined toward said wheel rim part, said apertured portion terminating axially rearwardly in an underturned flange bottoming on said wheel rim part and formed into a plurality of cover retaining fingers, each of which includes a sharply bent terminal extending generally radially and axially outwardly, the junction of said portions comprising a rigidifying backing relative to which said fingers resiliently flex in the application and removal of the cover, said slanting portion having its inner surface confronting the apertures in said apertured portion and cooperating with said apertured portion to define an annular air receiving chamber.

3. In a cover structure for a wheel including flanged tire rim and body parts, a circular wheel cover having an outwardly dished and radially outwardly slanting annular portion projecting axially substantially beyond the wheel and an integral radially outer divergent apertured portion continuous with said annular portion but oppositely inclined toward and bottoming on said wheel rim part, said annular portion cooperating with said apertured portion to reinforce the cover at the locale of said apertured portion, said divergent portion being inclined at an angle of about 45° to the axis of the wheel cover and having its inner surface confronting said apertures in the apertured portion for facilitating the circulation of air through the apertures in the rotation of the wheel.

References Cited in the file of this patent

UNITED STATES PATENTS

| | | |
|---|---|---|
| 2,022,174 | Allee | Nov. 26, 1935 |
| 2,368,228 | Lyon | Jan. 30, 1945 |

FOREIGN PATENTS

| | | |
|---|---|---|
| 431,007 | Italy | Feb. 23, 1948 |
| 787,597 | France | Sept. 25, 1935 |